United States Patent
Alexander et al.

(10) Patent No.: US 12,430,130 B2
(45) Date of Patent: Sep. 30, 2025

(54) FLOATING POINT NORM INSTRUCTION

(71) Applicant: Graphcore Limited, Bristol (GB)

(72) Inventors: Alan Alexander, Wotton-Under-Edge (GB); Mrudula Gore, Bath (GB)

(73) Assignee: GRAPHCORE LIMITED, Bristol (GB)

( * ) Notice: Subject to any disclaimer, the term of this patent is extended or adjusted under 35 U.S.C. 154(b) by 288 days.

(21) Appl. No.: 18/163,472

(22) Filed: Feb. 2, 2023

(65) Prior Publication Data
US 2023/0273791 A1    Aug. 31, 2023

(30) Foreign Application Priority Data
Feb. 28, 2022  (GB) ..................... 2202744

(51) Int. Cl.
  *G06F 9/30*  (2018.01)
(52) U.S. Cl.
  CPC ........ *G06F 9/3001* (2013.01); *G06F 9/30145* (2013.01)
(58) Field of Classification Search
  CPC .. G06F 9/3001; G06F 9/30036; G06F 9/3885; G06F 9/3893; G06F 9/30189; G06F 9/3853; G06F 7/5095; G06F 7/5443
  See application file for complete search history.

(56) References Cited

U.S. PATENT DOCUMENTS

| | | | |
|---|---|---|---|
| 2018/0225116 A1* | 8/2018 | Henry | G06F 17/10 |
| 2018/0285316 A1* | 10/2018 | Thorson | G06F 9/3001 |
| 2020/0210175 A1 | 7/2020 | Alexander | |
| 2020/0293330 A1* | 9/2020 | Mangnall | G06F 7/52 |
| 2021/0064365 A1* | 3/2021 | Thompto | G06F 9/30116 |
| 2021/0294610 A1 | 9/2021 | Mangnall | |

OTHER PUBLICATIONS

Zhe Jia, Blake Tillman, Marco Maggioni, and Daniele P. Scarpazza, "Dissecting the Graphcore IPU Architecture via Microbenchmarking", Dec. 17, Citadel Enterprise Americas, LLC, pp. 7-85 (Year: 2019).*
Search Report dated Oct. 11, 2022 for United Kingdom Patent Application No. GB2202744.5 3 pages.

* cited by examiner

*Primary Examiner* — Courtney P Spann
(74) *Attorney, Agent, or Firm* — HAYNES AND BOONE, LLP

(57) ABSTRACT

A hardware module is provided in an execution unit and is responsive to execution of multiple instances of a new type of instruction to perform a plurality of reductions in parallel. The hardware module comprises: a first accumulator storing first state associated with a first of the reductions; and a second accumulator storing second state associated with a second of the reductions. Upon execution of each of the multiple instances of the first type of instruction: an input value for the respective instance is provided to a first processing circuit of the hardware module such that the first processing circuit performs a first type of operation to update the first state; and the same input value is provided to the second processing circuit of the hardware module such that the second processing circuit performs a second type of operation to update the second state.

14 Claims, 10 Drawing Sheets

$$[S_{1,0}\ S_{1,2}\ S_{1,4}\ S_{1,6}\ S_{1,8}\ \ldots] = [S_{0,0}\ S_{0,2}\ S_{0,4}\ S_{0,6}\ S_{0,8}\ \ldots] + [X_{0,0}\ X_{0,1}\ X_{0,2}\ X_{0,3}\ X_{0,4}\ \ldots]$$

1st Instance $$[S_{2,0}\ S_{2,2}\ S_{2,4}\ S_{2,6}\ S_{2,8}\ \ldots] = [S_{1,0}\ S_{1,2}\ S_{1,4}\ S_{1,6}\ S_{1,8}\ \ldots] + [X_{1,0}\ X_{1,1}\ X_{1,2}\ X_{1,3}\ X_{1,4}\ \ldots]$$

2nd Instance $$[S_{3,0}\ S_{3,2}\ S_{3,4}\ S_{3,6}\ S_{3,8}\ \ldots] = [S_{2,0}\ S_{2,2}\ S_{2,4}\ S_{2,6}\ S_{2,8}\ \ldots] + [X_{2,0}\ X_{2,1}\ X_{2,2}\ X_{2,3}\ X_{2,4}\ \ldots]$$

3rd Instance $$[R_0\ R_1\ R_2\ R_3\ R_4\ \ldots] = [S_{n,0}\ S_{n,2}\ S_{n,4}\ S_{n,6}\ S_{n,8}\ \ldots] = [S_{n-1,0}\ S_{n-1,2}\ S_{n-1,4}\ S_{n-1,6}\ S_{n-1,8}\ \ldots] + [X_{n-1,0}\ X_{n-1,1}\ X_{n-1,2}\ X_{n-1,3}\ X_{n-1,4}\ \ldots]$$

nth Instance

Figure 5

$$[X_{0,0}\ X_{0,1}\ X_{0,2}\ X_{0,3}\ X_{0,4}\ \ldots] + [S_{0,0}\ S_{0,2}\ S_{0,4}\ S_{0,6}\ S_{0,8}\ \ldots] = [S_{1,0}\ S_{1,2}\ S_{1,4}\ S_{1,6}\ S_{1,8}\ \ldots]$$

1st Instance $$[X_{1,0}\ X_{1,1}\ X_{1,2}\ X_{1,3}\ X_{1,4}\ \ldots] + [S_{1,0}\ S_{1,2}\ S_{1,4}\ S_{1,6}\ S_{1,8}\ \ldots] = [S_{2,0}\ S_{2,2}\ S_{2,4}\ S_{2,6}\ S_{2,8}\ \ldots]$$

2nd Instance $$[X_{2,0}\ X_{2,1}\ X_{2,2}\ X_{2,3}\ X_{2,4}\ \ldots] + [S_{2,0}\ S_{2,2}\ S_{2,4}\ S_{2,6}\ S_{2,8}\ \ldots] = [S_{3,0}\ S_{3,2}\ S_{3,4}\ S_{3,6}\ S_{3,8}\ \ldots]$$

3rd Instance $$[X_{n-1,0}\ X_{n-1,1}\ X_{n-1,2}\ X_{n-1,3}\ X_{n-1,4}\ \ldots] + [S_{n-1,0}\ S_{n-1,2}\ S_{n-1,4}\ S_{n-1,6}\ S_{n-1,8}\ \ldots] = [S_{n,0}\ S_{n,2}\ S_{n,4}\ S_{n,6}\ S_{n,8}\ \ldots] = [R_0\ R_1\ R_2\ R_3\ R_4\ \ldots]$$

nth Instance

Figure 6

1st instance:
$$[X_{0,0}^2, X_{0,1}^2, X_{0,2}^2, X_{0,3}^2, X_{0,4}^2, \ldots] + [S_{0,0}, S_{0,2}, S_{0,4}, S_{0,6}, S_{0,8}, \ldots] = [S_{1,0}, S_{1,2}, S_{1,4}, S_{1,6}, S_{1,8}, \ldots]$$

2nd instance:
$$[X_{1,0}^2, X_{1,1}^2, X_{1,2}^2, X_{1,3}^2, X_{1,4}^2, \ldots] + [S_{1,0}, S_{1,2}, S_{1,4}, S_{1,6}, S_{1,8}, \ldots] = [S_{2,0}, S_{2,2}, S_{2,4}, S_{2,6}, S_{2,8}, \ldots]$$

3rd instance:
$$[X_{2,0}^2, X_{2,1}^2, X_{2,2}^2, X_{2,3}^2, X_{2,4}^2, \ldots] + [S_{2,0}, S_{2,2}, S_{2,4}, S_{2,6}, S_{2,8}, \ldots] = [S_{3,0}, S_{3,2}, S_{3,4}, S_{3,6}, S_{3,8}, \ldots]$$

nth instance:
$$[X_{n-1,0}^2, X_{n-1,1}^2, X_{n-1,2}^2, X_{n-1,3}^2, X_{n-1,4}^2, \ldots] + [S_{n-1,0}, S_{n-1,2}, S_{n-1,4}, S_{n-1,6}, S_{n-1,8}, \ldots] = [S_{n,0}, S_{n,2}, S_{n,4}, S_{n,6}, S_{n,8}, \ldots] = [R_0, R_1, R_2, R_3, R_4, \ldots]$$

Figure 7

FLOATING POINT NORM INSTRUCTION

CROSS-REFERENCE TO RELATED APPLICATIONS

The present application claims priority to United Kingdom Patent Application No. GB2202744.5 filed Feb. 28, 2022, the disclosure of which is hereby incorporated herein by reference in its entirety.

TECHNICAL FIELD

The present disclosure relates to a processing device, and in particular to a processing device comprising an execution unit for performing reduction operations.

BACKGROUND

A processing device may comprise an execution unit and a memory. The execution unit is capable of executing one or more program threads, in order to perform operations on data loaded from the memory to generate results, which are then stored in the memory. Certain types of processing device have specialised hardware for performing specific types of processing.

As an example, one area of computing in which such a specialised processing device may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a processing device specialised for machine intelligence applications may comprise a large degree of multi-threading. One form of parallelism can be achieved by means of an arrangement of multiple tiles on the same chip (i.e. same die), each tile comprising its own separate respective execution unit and memory (including program memory and data memory). Thus separate portions of program code can be run in parallel on different ones of the tiles.

Various algorithms for performing the training of a graph are known in the art, such as a back propagation algorithm based on stochastic gradient descent. Over multiple iterations, based on the training data set, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The training of a neural network can be performed using a multi-processing node system. Typically, at least some of the processing of each node can be carried out independently of processing of other nodes in the graph, and therefore large graphs expose great opportunities for concurrency and/or parallelism. The training of a neural network using a multi-processing node system is achieved by applying data parallelism in which each processing node derives weights or updates to weights for a neural network using a different data set. The updates/updated weights are then synchronised between the processing nodes during an exchange phase. Such a synchronisation process may involve exchanging updates between the processing nodes in one stage, with each processing node performing operations (e.g. averaging) on the updates it receives in the stage, before moving on to a further stage where the results of those operations, e.g. averaged updates, are themselves exchanged. The exchange of such updates can be performed using collectives.

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. For example, one type of collective is known as the all-reduce collective. An all-reduce collective comprises two stages, the first of which is referred to as "reduce-scatter", and the second of which is referred to as the "allgather" collective. Assuming that each of a plurality of processing nodes stores a different set of data, when the reduce-scatter collective is performed, at each step of the reduce-scatter collective, each processing node passes a different subset of data to at least one of its neighbours. Each processing node reduces the subset of data that it receives and then passes that reduced subset of data to at least one of its neighbours. Eventually, each processing node in the system ends up with a different subset of the total data, each of these subsets being the result of a reduction of all its corresponding starting subsets on each of the processing nodes. Following the reduce-scatter, an all-gather collective is performed, in which the subsets of data held by each processing node are shared between the processing node so that each processing node then has the same complete set of data.

Since, as part of the collective operations performed by a system, reduction operations are performed by the processing nodes of that system, for more efficient implementation of the collectives, it is desirable for each of the processing nodes to be capable of more efficiently handling the reduction operations.

SUMMARY

According to a first aspect, there is provided a processing device comprising an execution unit, wherein the execution unit comprises a hardware module responsive to execution of multiple instances of a first type of instruction to perform a plurality of reductions in parallel, each of the multiple instances taking a different operand comprising a respective first input value for the respective instance, wherein the hardware module comprises: a first accumulator, wherein the first accumulator stores first state associated with a first of the reductions; a second accumulator, wherein the second accumulator stores second state associated with a second of the reductions; a plurality of processing circuits comprising: a first of the processing circuits, which is associated with the first accumulator and is configured to update the first state; and a second of the processing circuits, which is associated with the second accumulator and is configured to update the second state, wherein circuitry of the execution unit is configured to, upon execution of each of the multiple instances of the first type of instruction: provide to the first of the processing circuits, the respective first input value for the respective instance such that the first of the processing circuits performs a first type of operation to update the first state held in the first accumulator; and provide to the second of the processing circuits, the respective first input value for the respective instance such that the second of the processing circuits performs a second type of operation to update the second state held in the second accumulator.

The execution unit of the processing device supports a new type of instruction (referred to herein as the norm instruction) for performing two different types of reduction operations in parallel on the same set of inputs.

According to a second aspect, there is provided a method for performing a plurality of reductions in parallel, wherein the method comprises: initializing first state held in a first accumulator and associated with a first of the reductions; initializing second state held in a second accumulator and associated with a second of the reductions; and upon execution of each of multiple instances of the first type of instruction: performing a first type of operation on a respective first input value for the respective instance so as to update the first state held in the first accumulator; and in parallel with performing the first type of operation, performing a second type of operation on the respective first input value for the respective instance so as to update the second state held in the second accumulator.

According to a third aspect, there is provided a computer program comprising a set of execution instructions, which when executed by at least one processor causes a method according to the second aspect to be performed.

According to a fourth aspect, there is provided a non-transitory computer readable storage medium storing a computer program according to the third aspect.

BRIEF DESCRIPTION OF DRAWINGS

For a better understanding of the present disclosure and to show how the same may be carried into effect, reference will now be made by way of example to the accompanying Figures in which:

FIG. 5 illustrates the reductions operations performed when a sum type of operation is set to be performed;

FIG. 6 illustrates the reduction operations performed when a sum of absolutes type of operation is set to be performed;

FIG. 7 illustrates the reduction operations performed when a sum of squares type of operation is set to be performed;

DETAILED DESCRIPTION

Embodiments are implemented in a processing device, which may take the form of a processor 4, which is described in more detail with reference to FIG. 1. In some embodiments, the processor 4 may take the form of a tile of a multi-tile processing unit. An example of such a multi-tile processing unit is described in more detail in our earlier application U.S. application Ser. No. 16/527,410, which is incorporated by reference.

Figure 1:
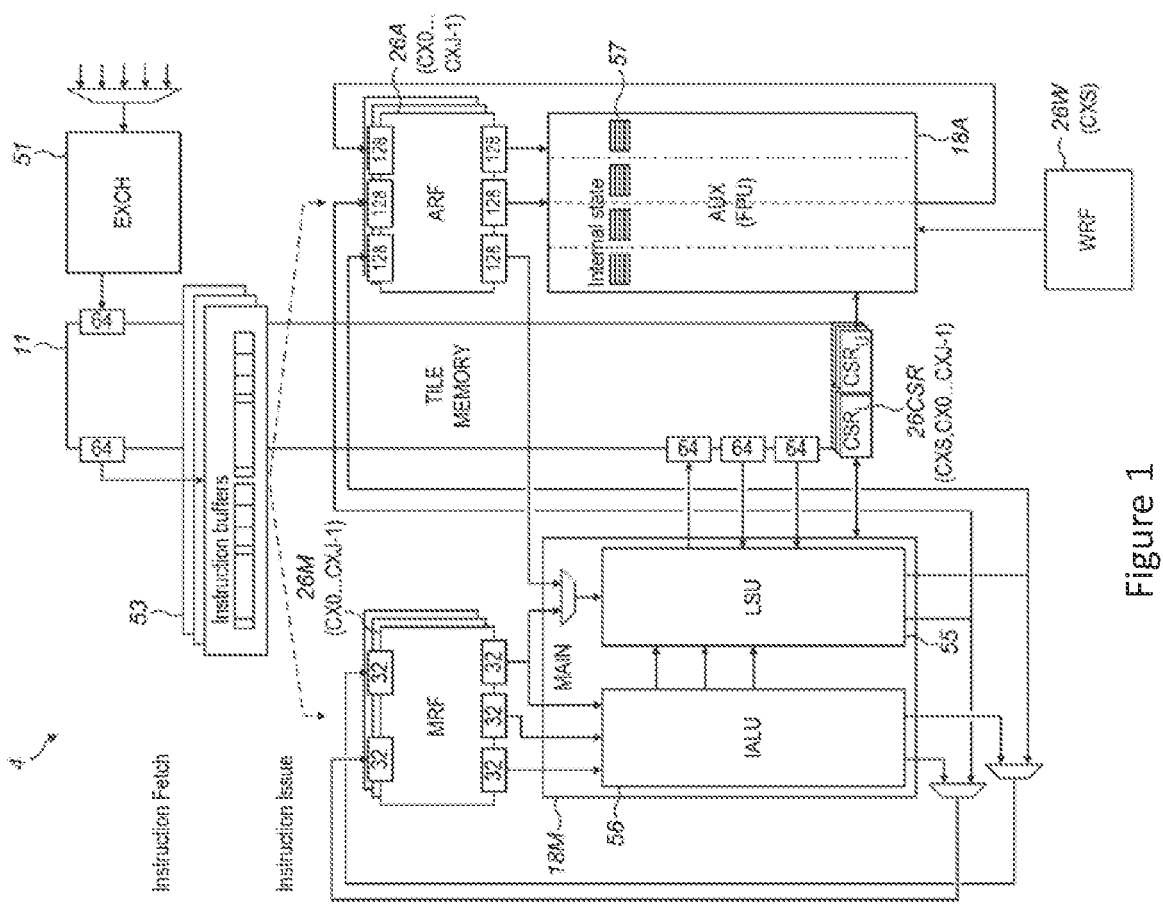
FIG. 1 illustrates a processing device in which embodiments are implemented.

Reference is made to FIG. 1 illustrates an example of the processor 4 including detail of the execution units 18A, 18M and context registers 26. The processor 4 shown includes a weights register file 26W, and so may be specially adapted for machine learning applications, in which machine learning models are trained by adjusting the weights for those models. However, embodiments of the application are not limited to machine learning applications but are more broadly applicable.

The processor 4 described is a multi-threaded processor capable of executed M thread concurrently. The processor 4 is able to support execution of M worker threads and one supervisor thread, where the worker threads perform arithmetic operations on data to generate results and the supervisor thread co-ordinates the worker threads and controls the synchronisation, sending and receiving functionality of the processor 4.

The processor 4 comprises a respective instruction buffer 53 for each of M threads capable of being executed concurrently. The context registers 26 comprise a respective main register file (MRF) 26M for each of M worker contexts and a supervisor context. The context registers further comprise a respective auxiliary register file (ARF) 26A for at least each of the worker contexts. The context registers 26 further comprise a common weights register file (WRF) 26W, which all the currently executing worker thread can access to read from. The WRF may be associated with the supervisor context in that the supervisor thread is the only thread that can write to the WRF. The context registers 26 may also comprise a respective group of control state registers 26CSR for each of the supervisor and worker contexts. The execution units comprises a main execution unit 18M and an auxiliary execution unit 18A. The main execution unit 18M comprises a load-store unit (LSU) 55 and an integer arithmetic logic unit (IALU) 56. The auxiliary execution unit 18A comprises at least a floating-point arithmetic unit (FPU).

In each of the J interleaved time slots S0 . . . SJ-1, the scheduler 24 controls the fetch stage 14 to fetch at least one instruction of a respective thread from the instruction memory 11, into the respective one of the J instruction buffers 53 corresponding to the current time slot. In embodiments, each time slot is one execution cycle of the processor, though other schemes are not excluded (e.g. weighted round-robin). In each execution cycle of the processor 4 (i.e. each cycle of the processor clock which clocks the program counter) the fetch stage 14 fetches either a single instruction or a small "instruction bundle" (e.g. a two-instruction bundle or four-instruction bundle), depending on implementation. Each instruction is then issued, via the decode stage 16, into one of the LSU 55 or IALU 56 of the main execution unit 18M or the FPU of the auxiliary execution unit 18A, depending on whether the instruction (according to its opcode) is a memory access instruction, an integer arithmetic instruction or a floating-point arithmetic instruction, respectively. The LSU 55 and IALU 56 of the main execution unit 18M execute their instructions using registers from the MRF 26M, the particular registers within the MRF 26M being specified by operands of the instructions. The FPU of the auxiliary execution unit 18A performs operations using registers in the ARF 26A and WRF 26W, where the particular registers within the ARF are specified by operands of the instructions. In embodiments the registers in the WRF may be implicit in the instruction type (i.e. pre-determined for that instruction type). The auxiliary execution unit 18A may also contain circuitry in the form of logical latches internal to the auxiliary execution unit 18A for holding some internal state 57 for use in performing the operations of one or more of the types of floating-point arithmetic instruction.

In embodiments that fetch and execute instructions in bundles, the individual instructions in a given instruction bundle are executed simultaneously, in parallel down independent pipelines 18M, 18A (shown in FIG. 1). In embodiments that execute bundles of two instructions, the two instructions may be executed simultaneously down respective auxiliary and main pipelines. In this case, the main pipeline is arranged to execute types of instruction that use the MRF and the auxiliary pipeline is used to execute types of instruction that use the ARF. The pairing of instructions into suitable complementary bundles may be handled by the compiler.

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However there is a single, shared weights register file (WRF) shared between the threads. Each thread can access the MRF and ARF of only its own context 26. However, all currently-running worker threads can access the common WRF. The WRF thus provides a common set of weights for use by all worker threads. In embodiments only the supervisor can write to the WRF, and the workers can only read from the WRF.

The instruction set of the processor 4 includes at least one type of load instruction whose opcode, when executed, causes the LSU 55 to load data from the data memory 22 into the respective ARF, 26A of the thread in which the load instruction was executed. The location of the destination within the ARF is specified by an operand of the load instruction. Another operand of the load instruction specifies an address register in the respective MRF 26M, which holds a pointer to an address in the data memory 22 from which to load the data. The instruction set of the processor 4 also includes at least one type of store instruction whose opcode, when executed, causes the LSU 55 to store data to the data memory 22 from the respective ARF of the thread in which the store instruction was executed. The location of the source of the store within the ARF is specified by an operand of the store instruction. Another operand of the store instruction specifies an address register in the MRF, which holds a pointer to an address in the data memory 22 to which to store the data. In general, the instruction set may include separate load and store instruction types, and/or at least one load-store instruction type which combines the load and store operations in a single instruction.

In response to the opcode of the relevant type of arithmetic instruction, the arithmetic unit (e.g. FPU) in the auxiliary execution unit 18A performs an arithmetic operation, as specified by the opcode, which comprises operating upon the values in the specified source register(s) in the threads' respective ARF and, optionally, the source register (s) in the WRF. It also outputs a result of the arithmetic operation to a destination register in the thread's respective ARF as specified explicitly by a destination operand of the arithmetic instruction.

It will be appreciated that the labels "main" and "auxiliary" are not necessarily limiting. In embodiments they may be any first register file (per worker context), second register file (per worker context) and shared third register file (e.g. part of the supervisor context but accessible to all workers).

The ARF 26A and auxiliary execution unit 18 may also be referred to as the arithmetic register file and arithmetic execution unit since they are used for arithmetic instructions (or at least the floating-point arithmetic). The MRF 26M and auxiliary execution unit 18 may also be referred to as the memory address register file and arithmetic execution unit since one of their uses is for accessing memory. The weights register file (WRF) 26W is so-called, because it is used to hold multiplicative weights used in a certain type or types of arithmetic instruction, to be discussed in more detail shortly. E.g. these could be used to represent the weights of nodes in a neural network. Seen another way, the MRF could be called the integer register file as it is used to hold integer operands, whilst the ARF could be called the floating-point register file as it is used to hold floating-point operands. In embodiments that execute instructions in bundles of two, the MRF is the register file used by the main pipeline and the ARF is the register used by the auxiliary pipeline.

In alternative embodiments, however, note that the register space 26 is not necessarily divided into these separate register files for these different purposes. Instead instructions executed through the main and auxiliary execution units may be able to specify registers from amongst the same shared register file (one register file per context in the case of a multithreaded processor). Also the pipeline 13 does not necessarily have to comprise parallel constituent pipelines (e.g. aux and main pipelines) for simultaneously executing bundles of instructions.

The processor 4 may also comprise an exchange interface 51 for exchanging data between the memory 11 and one or more other resources, e.g. other instances of the processor and/or external devices such as a network interface or network attached storage (NAS) device. As discussed above, in embodiments the processor 4 may form one of an array 6 of interconnected processor tiles, each tile running part of a wider program. The individual processors 4 (tiles) thus form part of a wider processor or processing system 6. The tiles 4 may be connected together via an interconnect subsystem, to which they connect via their respective exchange interface 51. The tiles 4 may be implemented on the same chip (i.e. die) or on different chips, or a combination (i.e. the array may be formed from multiple chips each comprising multiple tiles 4). The interconnect system and exchange interface 51 may therefore comprise an internal (on-chip) interconnect mechanism and/or external (inter-chip) exchange mechanism, accordingly.

According to embodiments, a hardware module is provided in the floating-point execution unit 18A for evaluating a new type of instruction, which is referred to herein as the norm instruction. The norm instruction comes in different varieties in dependence upon the format of the floating-point number that is processed in response to the instruction. The terminology "norm instruction" may be understood to refer to any of these different types of norm instruction, unless specifically identified as being a particular type of norm instruction.

When executed, the norm instruction causes up to two different types of operation to be performed to update state information held in accumulators. The update of the state held in the accumulators is based on values that serve as an operand of the instruction. Each time an instance of the norm instruction is executed, the state held in each accumulator is updated based on one of a set of values that serve as the operand for that instance of the norm instruction. The consequence of executing multiple instances of the norm instruction is to perform a plurality of reductions in parallel, where at least one of those reductions is performed by applying a first type of operation to update state information held in at least one accumulator, whilst at least one other of those reductions is performed by applying a second type of operation to update state information held in at least on further accumulator.

The hardware module comprises at least one unit (referred to herein as the 'AMP unit'), which performs two reductions in parallel. Preferred embodiments are described in which the hardware module comprises a plurality of AMP units, which enables more than two reductions to be performed in parallel.

Figure 2:
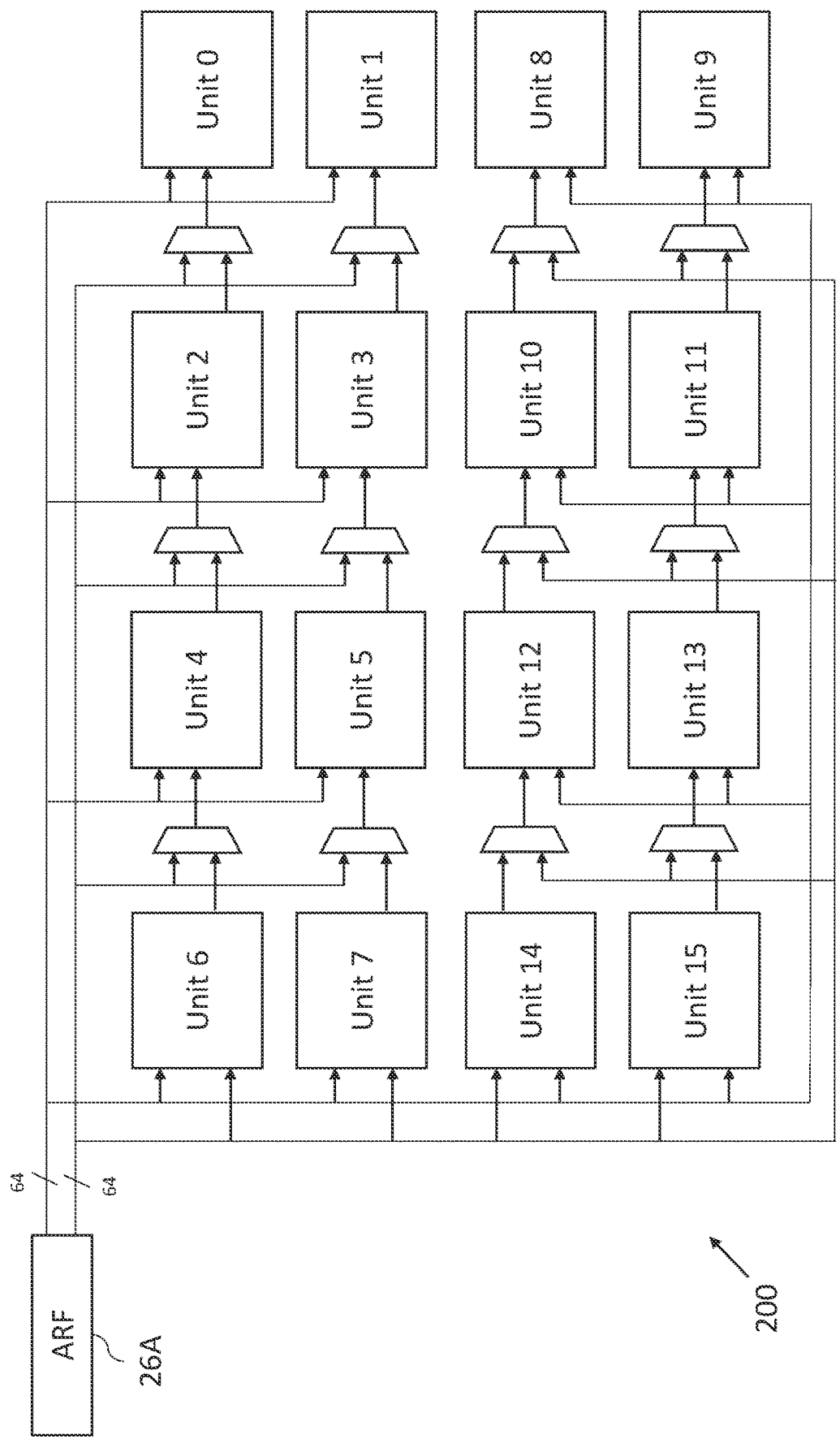
FIG. 2 illustrates circuitry of a hardware module of an execution unit of the processing device.

Reference is made to FIG. 2, which illustrates an example of the hardware module 200 that is part of the execution unit 18A. The hardware module 200 comprises the accumulators for maintaining the state information associated with each reduction and comprises the processing circuitry for receiving the input values provided as the operand for the norm instruction, and updating the state information held in each accumulator based on those input values.

The hardware module 200 comprises a plurality of AMP units, which are labelled Unit 0 to Unit 15 in FIG. 2. Each of the AMP units comprises processing circuitry for performing arithmetic operations, in particular multiplications and additions, on input values supplied to itself. Each of the AMP units also comprises a pair of accumulators for storing state information associated with the operations performed by the respective processing circuitry.

Control circuitry (not shown in FIG. 2) is also provided as part of the hardware module 200 for controlling the flow of data to and from the different AMP units of the hardware module.

FIG. 2 also illustrates an example ARF 26A for holding input values for supplying to the units of the hardware module. The ARF 26A comprises 16 registers, each of which is 32 bits. The wiring is provided in the processing device 4, enables up to two 16-bit data items from the ARF 26A from be provided to each of the AMP units. The two 16-bit data items could, for example constitute a single 32-bit FP number or could constitute two 16-bit FP numbers. Although FIG. 2 illustrates only a single ARF 26A for supplying input values to the AMP units, further ARFs 26A of the device 4 may also provide input values to different ones of the AMP units in response to execution of the same norm instruction.

The distribution of the input values between the AMP units when the norm instruction is executed depends upon the floating-point format of the input values. When a first type of norm instruction (referred to herein as f32v8norm) is executed, the input operand of the instruction is a vector of eight single-precision (i.e. 32 bit) floating-point values. Prior to execution of the f32v8norm instruction, these are stored across one or more of the ARFs 26A. In response to execution of the f32v8norm instruction by the execution unit 18A, circuitry of the execution unit 18A supplies each of the eight floating-point numbers to a different one of the AMP units 0 to 7. Each of these AMP units 0 to 7 performs processing of its received input FP value so as to update the accumulator state held in at least one of the accumulators of that AMP unit.

When a second type of norm instruction (referred to herein as f16v16norm) is executed, the input operand is a vector of sixteen half-precision (i.e. 16 bits) floating-point values. Prior to execution of the f16v16norm instruction, this set of values is stored across one or more of the ARFs 26A. In response to execution of the f16v16norm instruction by the execution unit 18A, circuitry of the execution unit 18A supplies each of the sixteen floating-point numbers to a different one of the AMP units 0 to 15. Each of these AMP units 0 to 15 performs processing of its received input FP value so as to update the accumulator state held in at least one of the accumulators of that AMP unit.

When a third type of norm instruction (referred to herein as f8v16norm) is executed, the input operand is a vector of sixteen quarter-precision (i.e. 8 bits) floating-point values. Prior to execution of the f8v16norm instruction, this set of values is stored in one of the ARFs 26A. In response to execution of the f8v16norm instruction by the execution unit 18A, circuitry of the execution unit 18A supplies each of the sixteen FP numbers to a different one of the AMP units 0 to 15. Each of these AMP units 0 to 15 performs processing of its received input FP value so as to update the accumulator state held in at least one of the accumulators of that AMP unit.

Figure 3:
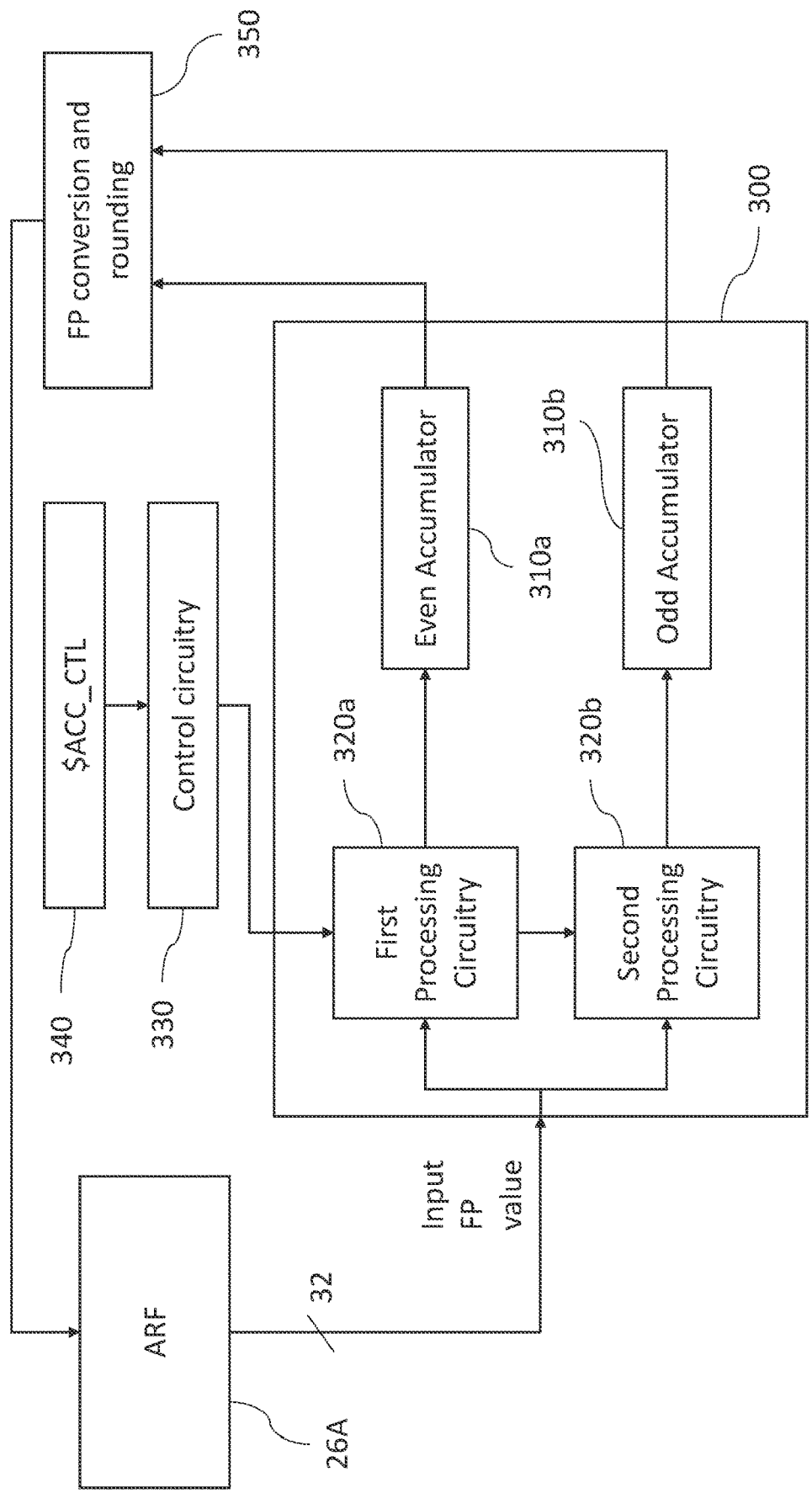
FIG. 3 illustrates circuitry of an individual AMP unit within the hardware module.

Reference is made to FIG. 3, which illustrates an example AMP unit 300 for performing the processing to update its accumulator state. Unless otherwise stated, the described features and behaviour of AMP unit 300 pertains to each of the AMP units shown in FIG. 2.

The AMP unit 300 comprises two accumulators, including a first accumulator 310a and a second accumulator 310b. The first accumulator 310a may be referred to as an even accumulator 310a, reflecting a numbering scheme by which each first accumulator 310a of the AMP units is labelled with an even number. Likewise, the second accumulator 310b may be referred to as an odd accumulator 310b, reflecting a numbering scheme by which each second accumulator 310b of the AMP units is labelled with an odd number.

The first accumulator 310a is associated with a first processing circuitry 320a, whilst the second accumulator 310b is associated with a second processing circuitry 320b. When the norm instruction is executed, each of the processing circuitries 320a, 320b performs operations selected in dependence upon the control information held in a control register 340. The control register 340 is a CSR 26 of the worker thread that executes the norm instruction. On the basis of the control information held in the control register 340, control circuitry 330 of the device 4 controls which operations (if any) are performed by the processing circuitries 320a, 320b on the input FP value provided to the AMP unit 300 when the norm instruction is executed. The information in control registers 340 is used by the control circuitry 330 to control the operations of each first processing circuitry 320a in each of the AMP units that are responsible for performing processing when the instruction is executed. Likewise, the information in control registers 340 is used by the control circuitry 330 to control the operations of each second processing circuitry 320b in each of the AMP units that are responsible for performing processing when the instruction is executed.

Figure 4:
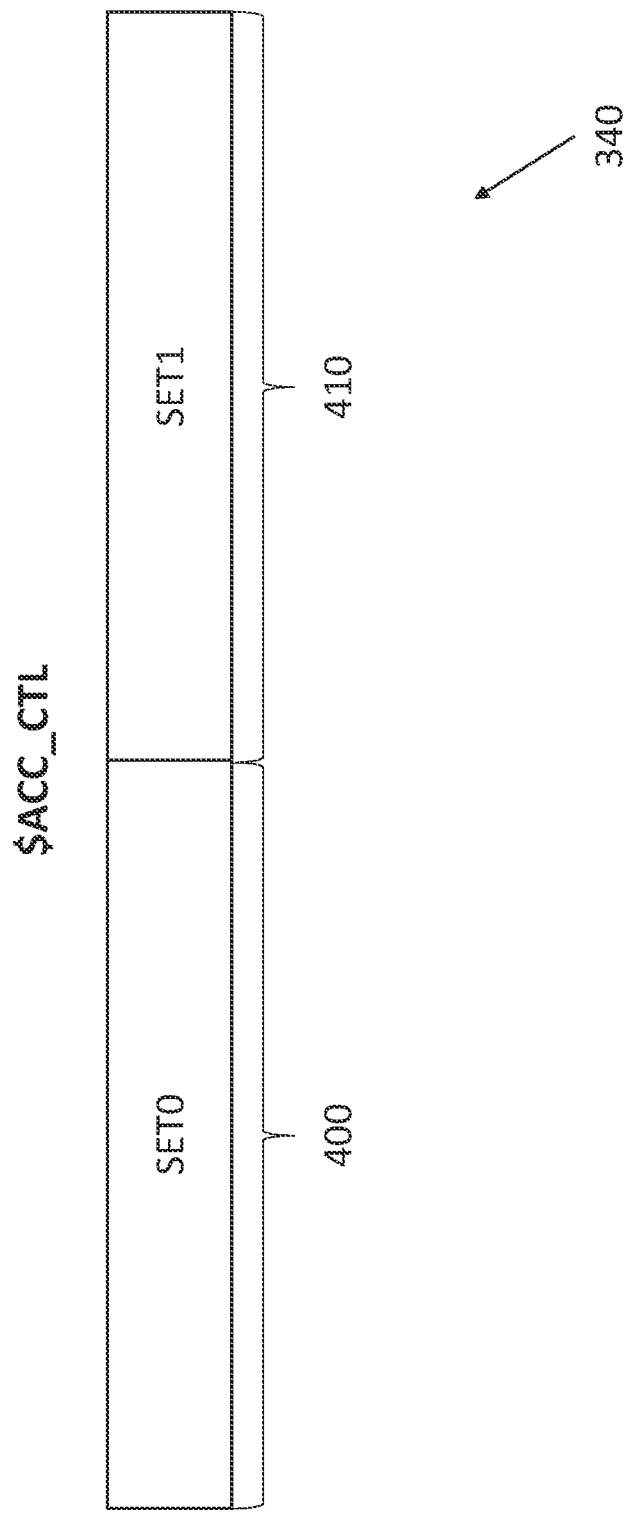
FIG. 4 illustrates a control register for controlling the operations performed in response to execution of the norm instruction.

Reference is made to FIG. 4, which illustrates the fields of the control registers 340. The control register 340 comprises a first field 400 (which may be referred to as SET0) and a second field 410 (which may be referred to as SET1).

The first field 400 defines the type of operation to be performed by the first processing circuitry 320a in response to execution of a norm instruction. The operations performed for different values of the first field 400 are represented in table 1. The first field 400 comprises two bits that together can take one of four different values. In the case that the first field 400 is given by 0b00, the first processing circuitry 320a performs no operation when the norm instruction is executed. In the case that the first field 400 is given by 0b01, the first processing circuitry 320a performs a square operation to square its input FP value and then adds the result of this square operation to the state held in the even accumulator 310a. As represented in table 1, this operation (i.e. sqacc operation) is part of performing an accumulation of squares of the input values supplied when multiple instructions are executed. In the case that the first field 400 is given by 0b10, the first processing circuitry 320a adds its input FP value to the state held in the even accumulator 310a. As represented in table 1, this operation (i.e. acc operation) is part of performing an accumulation of input value supplied when multiple instructions are executed. In the case that the first field is given by 0b11, the first processing circuitry 320a sets the sign bit of the input FP value such that the input FP value is positive (if it is not already positive) and then adds its input FP value to the state held in its associated even accumulator 310a. As represented in table 1, this operation (i.e. absacc operation) is part of performing an accumulation of the magnitudes of the input values that are supplied when multiple instructions are executed.

TABLE 1

| SET0 | Operation |
| --- | --- |
| 0b00 | No operation |
| 0b01 | Sqacc operation |
| 0b10 | Acc operation |
| 0b11 | Absacc operation |

The second field 410 defines the type of operation to be performed by the second processing circuitry 320b in response to execution of a norm instruction. The operations performed for different values of the second field 410 are represented in table 2. The second field 410 comprises two bits that together can take one of four different values. In the case that the second field 410 is given by 0b00, the second processing circuitry 320b performs no operation when the norm instruction is executed. Also, in the case that the second field 410 is given by 0b01, the second processing circuitry 320b performs no operation when the norm instruction is executed. In the case that the second field 410 is given by 0b10, the second processing circuitry 320b adds its input FP value to the state held in its associated even accumulator 310b. As represented in table 2, this operation (i.e. acc operation) is part of performing an accumulation of the input values supplied by multiple norm instructions. In the case that the second field is given by 0b11, the second processing circuitry 320b sets the sign bit of the input FP value such that the input FP value is positive (if it is not already positive) and then adds its input FP value to the state held in its associated even accumulator 310b. As represented in table 2, this operation (i.e. absacc operation) is part of performing an accumulation of the magnitudes of the input values supplied by multiple norm instructions.

TABLE 2

| SET1 | Operation |
| --- | --- |
| 0b00 | No operation |
| 0b01 | No operation |
| 0b10 | Acc operation |
| 0b11 | Absacc operation |

As may be noted from a comparison of tables 1 and 2, the first processing circuitry 320a supports the squaring and addition of input FP values, whereas the second processing circuitry 320b does not. In embodiments, unlike the second processing circuitry 320b, the first processing circuitry 320a includes a multiplier for enabling this type of operation.

It is appreciated that, when the first and second values in the control register 340 are held to certain values and a norm instruction is executed, the first processing circuitry 320a and the second processing circuitry 320b will both perform operations to update the state in their respective accumulators 310a, 310b. In this case, both processing circuits 320a, 320b perform their operations in parallel on a same input FP value received from an ARF 26A.

When multiple instance of the norm instruction are executed, both the first and second processing circuits 320a, 320b update their associated state multiple times using different FP numbers, where each FP number is supplied in response to execution of a different one of the norm instruction instances. The result is to perform two reduction operations in parallel, where those two reduction operations may be performed by performing different types of operation to update the accumulator state. For example, the accumulator state in even accumulator 310a may be updated by performing the sum of squares of the input FP values, whilst in parallel, the accumulator state in the odd accumulator 310b may be updated by performing the sum of the input FP values.

When performing such reduction operations, an initialization instruction is first executed by the execution unit 18A to set the accumulator state in the accumulators 310a, 310b to zero. Then the multiple instances of the norm instruction are executed by the execution unit 18A. The resulting values from the two reductions are read out of the accumulators 310a, 310b by circuitry of the execution unit 18A. These result values may be subject to conversion to a lower precision FP format and rounding at circuitry 350 before being stored back in one of the ARFs 26A as the results of the reductions. The conversion to a lower precision involves truncating the mantissas of each of the result values to the length specified for the mantissas in the lower precision floating point format, and performing the rounding of the LSB of this mantissa using an appropriate rounding rule (e.g. stochastic rounding, round to nearest even).

Although FIG. 3 shows only a single AMP unit 300, when an instance of the norm instruction is executed, the operations described as being performed by that AMP unit 300 are performed by multiple such AMP units in the system. As a result, when multiple instances of the norm instruction are executed, more than two reductions are performed. When multiple instances of the f32v8norm instruction are executed, eight of the AMP units perform operations to update their accumulator state, implying that up to 16 reductions may be performed in parallel. When multiple instances of the f16v16norm instruction are executed, 16 of the AMP units perform operations to update their accumulator state, such that up to 32 reductions may be performed in parallel. When multiple instances of the f8v16norm instruction are executed, 16 of the AMP units perform operations to update their accumulator state, such that up to 32 reductions may be performed in parallel.

Reference is made to FIG. 5, which illustrates an example of the reductions that may be performed across multiple corresponding ones of the accumulators, in the case that the control register 340 indicates that a sum of input FP values is performed for updating the state of those accumulators. The state shown is that of the even accumulators 310a, but the same operations could be performed using the odd accumulators 310b. The initial state of the accumulators 310a is represented as a vector $[S_{0,0}, S_{0,2}\ S_{0,4}\ S_{0,6} \ldots ]$, where each element of that vector represents the state of one of the accumulators 310a. When a first instance of the norm instruction is executed by the execution unit 18A that first instance takes as an operand, the vector [$X_{0,0}$, $X_{0,1}$, $X_{0,2}$, $X_{0,3}$ . . . ]. In response to execution of the first instance of the norm instruction, each processing circuitry 320a of the AMP units involved in execution of the instruction adds one element of that vector to its associated accumulator state. The resulting updated accumulator state is represented by the vector [$S_{1,0}$, $S_{1,2}$ $S_{1,4}$ $S_{1,6}$ . . . ].

As shown in FIG. 5, when further instances of the norm instruction are executed, the accumulator state is updated in a similar way. The vector [$X_{1,0}$, $X_{1,1}$, $X_{1,2}$, $X_{1,3}$ . . . ] acts as the operand of the second instance of the instruction, the vector [$X_{2,0}$, $X_{2,1}$, $X_{2,2}$, $X_{2,3}$ . . . ] acts as to the operand of the third instance of the instruction, and so on. The final state produced after n instances of the norm instruction represents a set of results of the reduction operation. This set of results is read out of the accumulators 310a to provide the results vector [$R_0$, $R_1$, $R_2$, $R_3$ . . . ].

Reference is made to FIG. 6, which illustrates a different example as to how the state of the accumulators 310a may be updated in response to execution of multiple norm instructions. The state shown is that of the even accumulators 310a, but the same operations could be performed using the odd accumulators 310b. The operations performed are the same as those illustrated in FIG. 5, with the difference that, in the example of FIG. 6, the first processing circuitry 320a first determines the absolute value of the input FP value, and then uses the absolute value to update the state.

Reference is made to FIG. 7, which illustrates a different example as to how the state of the even accumulators 310a may be updated in response to the execution of multiple norm instructions. The operations performed are the same as those illustrated in FIG. 5, with the difference that in the example of FIG. 7, the first processing circuitry 320a, first determines the square of the input FP value and then uses that square to update the state.

Figure 8:
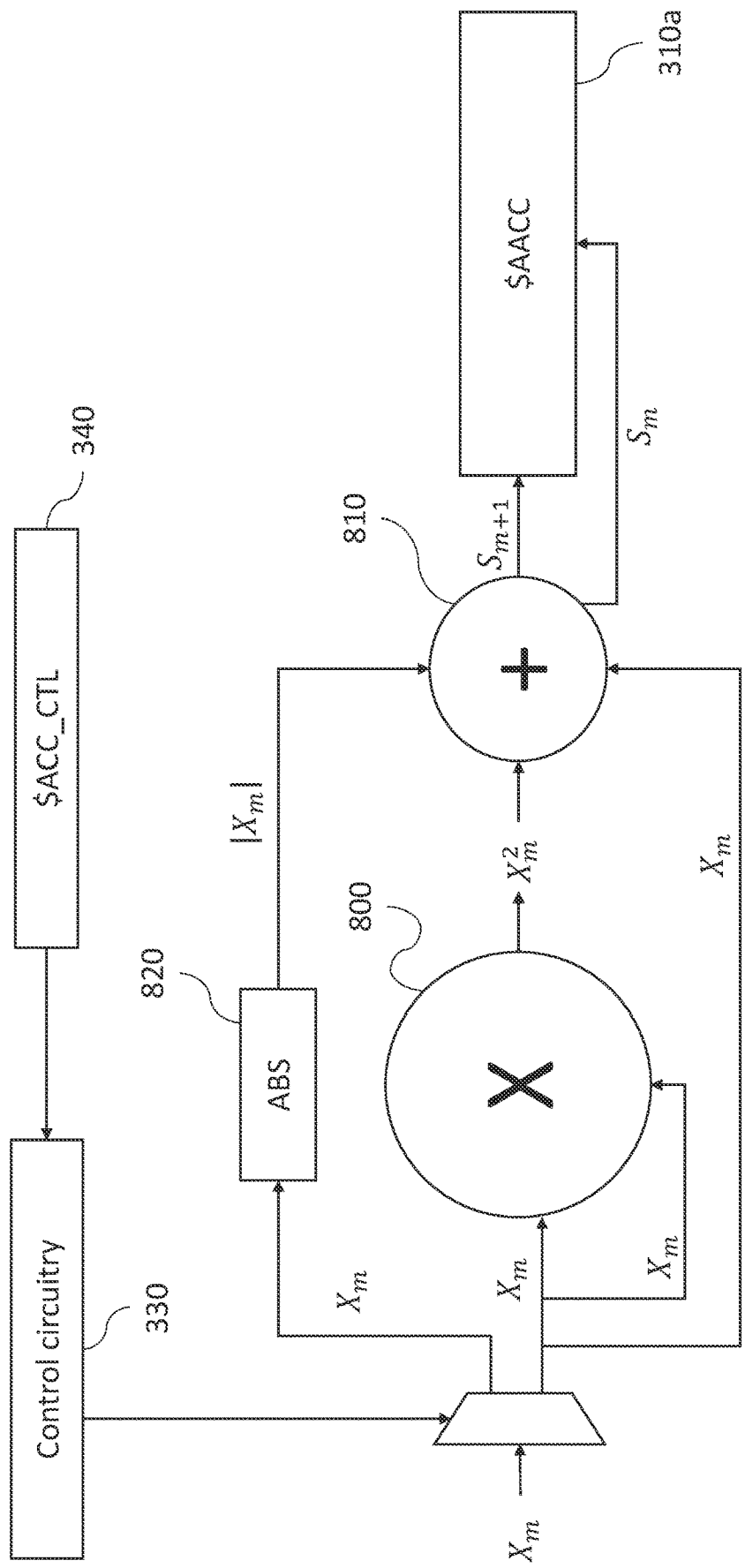
FIG. 8 illustrates a first set of processing circuitry within an AMP unit for updating associated accumulator state.

Reference is made to FIG. 8, which illustrates an example of circuitry that may be part of each first processing circuitry 320a and used for updating the state in an even accumulator 310a. The first processing circuitry 320a includes a multiplier 800 for determining the square of an input FP value (shown as $X_m$). This multiplier 800 is a multiplier for multiplying FP numbers and so includes circuitry for separately handling the exponent, mantissa, and sign bits. The first processing circuitry 320a includes addition circuitry 810 for performing an addition based on the input FP to the current state information to generate the updated state information. The first processing circuitry 320a also includes circuitry 820 for determining the magnitude of an input FP value. This circuitry 820 checks the sign bit of the input FP value, and if the sign bit is equal to one (indicating that the input FP value is negative), the circuitry 820 sets the sign bit equal to zero (such that the input FP value is then positive).

Although not shown in FIG. 8, the processing circuitry 320a also includes alignment circuitry for aligning the mantissas of the values subject to the addition by the addition circuitry 810.

The first processing circuitry 320a operates under the control of the control circuitry 330, which, in dependence upon the control information in register 340, controls which operation the first processing circuitry 320a performs. The control circuitry 330 may cause the circuitry 320a to determine the square of an input FP value (shown as $X_m$) and use this square ($X_m^2$) to update the state in accumulator 320a. The control circuitry 330 cause $X_m$ to be directed to the multiplier 800 such that the multiplier 800 determines the square of this value. The addition circuitry 810 adds this output (i.e. $X_m^2$) of the multiplier 800 to the state information $S_m$ held in the accumulator 310a to generate updated state information $S_{m+1}$, which is then stored back in the accumulator 310a.

The control circuitry 330 may cause the circuitry 320a to use the unchanged input value $X_m$ to update the accumulator state, by providing $X_m$ to the addition circuitry 810 to be added to the current state ($S_m$), with the updated state ($S_{m+1}$) then being written back to the accumulator 310a.

The control circuitry 330 may cause the circuitry 820 to determine the absolute value of $X_m$ and cause use this absolute value (i.e. $|X_m|$) to be used to update the accumulator state, by causing $|X_m|$ to be provided to the addition circuitry 810 to be added to the current state ($S_m$), with the updated state ($S_{m+1}$) then being written back to the accumulator 310a.

Figure 9:
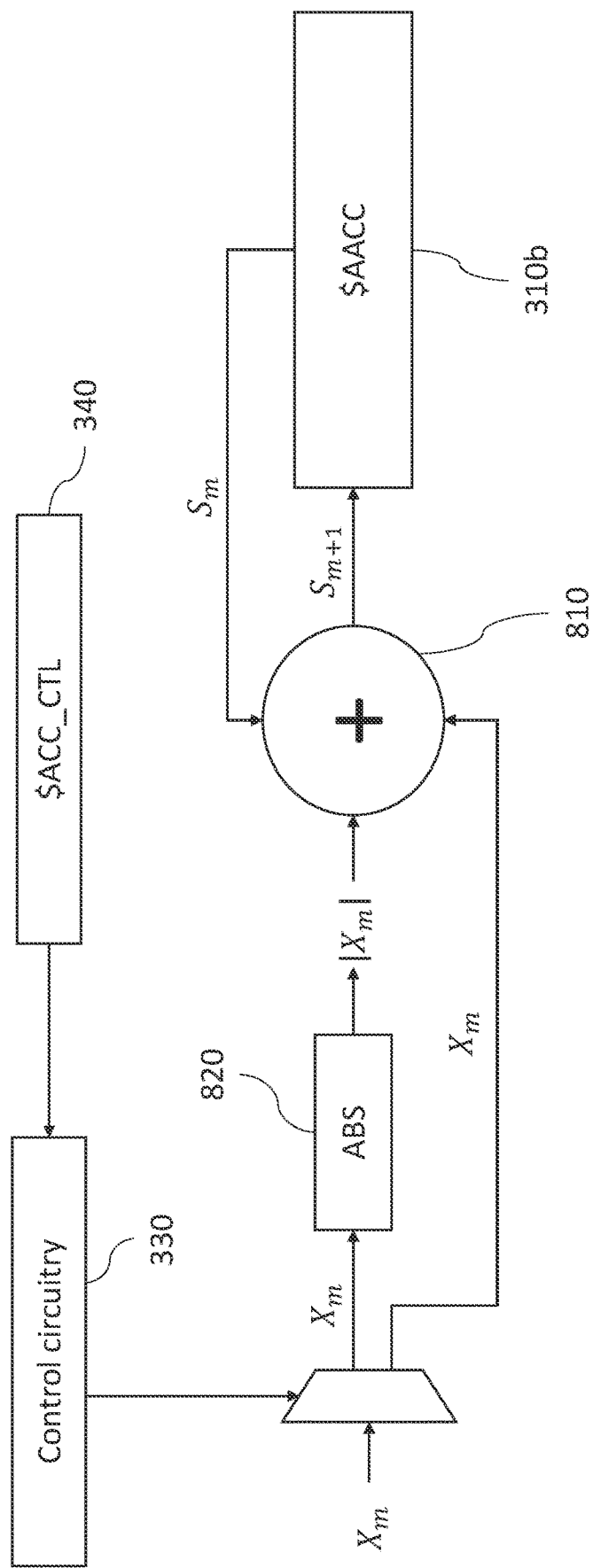
FIG. 9 illustrate a second set of processing circuitry within an AMP unit for updating associated accumulator state.

Reference is made to FIG. 9, which illustrates an example of circuitry that may be part of each second processing circuitry 320a and used for updating the state in an odd accumulator 310b.

The control circuitry 330 may cause the circuitry 320b to use the unchanged input value $X_m$ to update the accumulator state, by providing $X_m$ to the addition circuitry 810 to be added to the current state ($S_m$), with the updated state ($S_{m+1}$) then being written back to the accumulator 310b.

The control circuitry 330 may cause the circuitry 820 to determine the absolute value of $X_m$ and cause this absolute value (i.e. $|X_m|$) to be used to update the accumulator state, by causing $|X_m|$ to be provided to the addition circuitry 810 to be added to the current ($S_m$), with the updated state ($S_{m+1}$) then being written back to the accumulator 310b.

Figure 10:
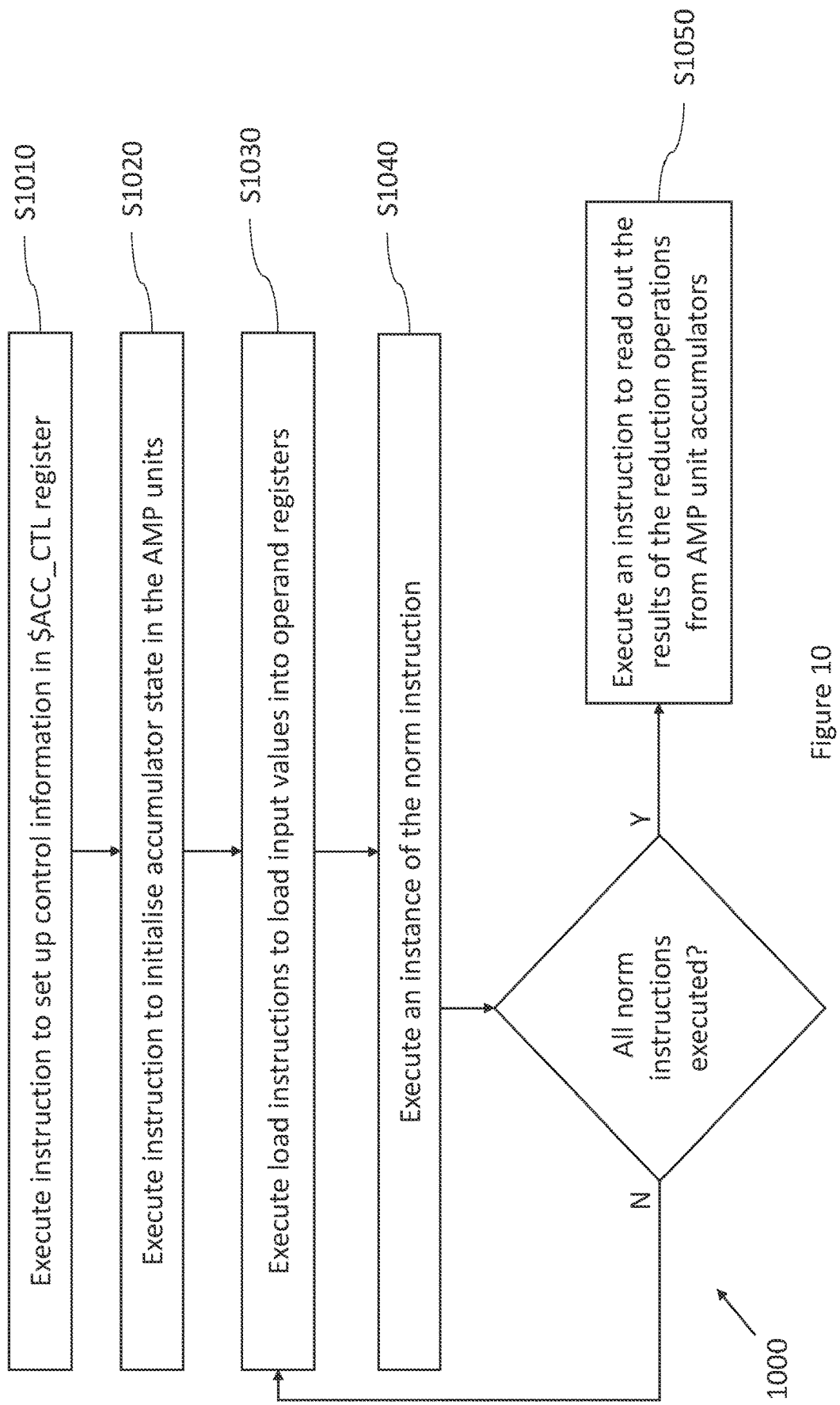
FIG. 10 illustrates a method according to embodiments.

Reference is made to FIG. 10, which illustrates an example method 1000 implemented in the processing device 4 for performing a plurality of reductions.

At S1010, an instruction is executed by the execution unit 18M to set up the control information in the $ACC_CTL register. When this instruction is executed, the control information is loaded from the memory 11 into the CSR 26 for the worker thread that will execute the norm instructions to perform the reductions.

At S1020, an instruction is executed by the execution unit 18A to initialize the accumulator state held in the AMP units. This initialization involves writing the state values in the AMP units to zero.

At S1030, the load store unit 55 executes load instructions to load the input values into the ARF/s 26. These input values form the operand for the first of the norm instructions to be executed.

At S1040, the execution unit 18A executes a first instance of the norm instruction to cause each of the input values loaded into the operand registers at S1030 to be supplied to a different one of the AMP units. Each first processing circuitry 320a and second processing circuitry 320b in these AMP units performs its operations to update its respective accumulator state. The operations performed by each circuit 320a, 320b depend upon the control information in the register 340.

If all instances of the norm instructions have not been executed for performing the reductions, S1040 is again performed.

Once all of the instances of the norm instructions have been executed for performing the reductions, the method 1000 proceeds to S1050. At S1050, the execution unit 18A executes an instruction to read out the result of the reduction operations from the accumulators of the AMP units. These results are then held in the arithmetic registers 26A, from where they may be stored back to memory 11 or used as inputs for subsequent instructions executed by the execution unit 18A.

One application of the norm instruction may be found in neural networks. When performing normalisation within a neural network, it is required to calculate the mean and variance of a set of values. Calculating the mean requires computing the sum of the values, whilst calculating the variance requires computing the sum-of-squares. Using the norm instruction allows both of these calculations required for determining the mean and variance to be performed in parallel.

In the above examples, any of the describes operations are, unless specified otherwise, performed by circuitry of the processing device 4.

It would be appreciated that the embodiments have been described by way of example only.

The invention claimed is:

1. A processing device comprising an execution unit, wherein the execution unit comprises a hardware module responsive to execution of multiple instances of a first type of instruction to perform a plurality of reductions in parallel, each of the multiple instances configured to take a different operand comprising a respective first input value for a respective instance, wherein the hardware module comprises a plurality of units, wherein for each of the multiple instances of the first type of instruction, each respective different operand comprises a plurality of input values, wherein each of the units comprises:
   a first accumulator, wherein the first accumulator is configured to store a first state associated with a first of the reductions;
   a second accumulator, wherein the second accumulator is configured to store a second state associated with a second of the reductions;
   a first processing circuit, which is associated with the first accumulator and is configured to update the first state; and
   a second processing circuit, which is associated with the second accumulator and is configured to update the second state,
   wherein circuitry of the execution unit is configured to, upon execution of each of the multiple instances of the first type of instruction:
   provide to a respective first processing circuit, the respective first input value for the respective instance such that the respective first processing circuit performs a first type of operation to update a respective first state held in a respective first accumulator; and
   provide to a respective second processing circuit, the respective first input value for the respective instance such that the respective second processing circuit performs a second type of operation to update a respective second state held in a respective second accumulator;
   wherein the circuitry of the execution unit is further configured to, in response to execution of each of the multiple instances of the first type of instruction:
   provide to each of the units, a different one of the input values of an operand of a respective instance.

2. The processing device of claim 1, comprising at least one control register, wherein the at least one control register is configured to store a first indication of the first type of operation and a second indication of the second type of operation, wherein the circuitry of the execution unit is configured to, for each of the plurality of units:
   cause the first processing circuit to perform the first type of operation responsive to the first indication; and
   cause the second processing circuit to perform the second type of operation responsive to the second indication.

3. The processing device of claim 2, wherein the at least one control register is configured to:
   subsequently store a third indication indicating that one of the first processing circuit and the second processing circuit is configured to perform no operation in response to execution of further multiple instances of the first type of instruction.

4. The processing device of claim 1, wherein for each of the instances of the first type of instruction, the first type of operation comprises one of:
   determining an updated value of the first state by adding the respective first input value for the respective instance to a current value of the first state;
   determining the updated value of the first state by adding a square of the respective first input value of the respective instance to the current value of the first state; or
   determining the updated value of the first state by adding a number representing an absolute value of the respective first input value of the respective instance to the current value of the first state.

5. The processing device of claim 1, wherein for each of the instances of the first type of instruction, the second type of operation comprises one of:
   determining an updated value of the second state by adding the respective first input value for the respective instance to a current value of the second state; or
   determining the updated value of the second state by adding a number representing an absolute value of the respective first input value for the respective instance to the current value of the second state.

6. The processing device of claim 1, wherein the execution unit is configured to, prior to execution of the multiple instances of the first type of instruction and for each of the plurality of units, execute at least one initialization instruction to initialize the first state and the second state.

7. The processing device of claim 6, wherein the initialization of the first state and the second state comprises writing zeros to the first accumulator and to the second accumulator.

8. The processing device of claim 1, wherein the execution unit is configured to, following execution of the multiple instances of the first type of instruction and for each of the plurality of units, execute at least one further instruction to:
   read out the first state from the first accumulator to provide a result for the first of the reductions; and
   read out the second state from the second accumulator to provide a result for the second of the reductions.

9. The processing device of claim 8, wherein the execution unit comprises floating-point conversion and rounding circuitry configured to, for each of the plurality of units:
   truncate and round a mantissa of the first state to provide the result for the first of the reductions in a first floating-point format; and
   truncate and round a mantissa of the second state to provide the result for the second of the reductions in the first floating-point format.

10. The processing device of claim 1, wherein for each of the multiple instances, the respective input value comprises a floating-point value.

11. The processing device of claim 1, wherein the execution unit supports multiple subtypes of the first type of instruction, wherein different ones of the multiple subtypes operate on different floating-point number formats.

12. A method for performing a plurality of reductions in parallel, wherein the method comprises:
  initializing a first state held in a first accumulator and associated with a first of the reductions;
  initializing a second state held in a second accumulator and associated with a second of the reductions;
  upon execution of each of multiple instances of a first type of instruction:
    performing a first type of operation on a respective first input value for a respective instance of the first type of instruction so as to update the first state held in the first accumulator; and
    in parallel with performing the first type of operation, performing a second type of operation on the respective first input value for the respective instance of the first type of instruction so as to update the second state held in the second accumulator;
  storing a first indication of the first type of operation and a second indication of the second type of operation in at least one control register;
  causing a first processing circuit to perform the first type of operation responsive to the first indication;
  causing a second processing circuit to perform the second type of operation responsive to the second indication; and
  subsequently storing in the at least one control register a third indication indicating that the first processing circuit is configured to perform no operation in response to execution of further multiple instances of the first type of instruction.

13. A non-transitory computer readable medium storing a computer program comprising a set of execution instructions, which when executed by at least one processor causes a method for performing a plurality of reductions in parallel to be performed, the method comprising:
  initializing a first state held in a first accumulator and associated with a first of the reductions;
  initializing a second state held in a second accumulator and associated with a second of the reductions; and
  upon execution of each of multiple instances of a first type of instruction:
    causing a first processing circuit to perform a first type of operation on a respective first input value for a respective instance of the first type of instruction so as to update the first state held in the first accumulator; and
    in parallel with performing the first type of operation, causing a second processing circuit to perform a second type of operation on the respective first input value for the respective instance of the first type of instruction so as to update the second state held in the second accumulator,
    wherein the first processing circuit comprises different circuitry to the second processing circuit, the different circuitry configured to support one or more different types of operation for updating accumulator state that are not supported by the second processing circuit.

14. The non-transitory computer readable medium of claim 13, wherein the method further comprises:
  storing a first indication of the first type of operation and a second indication of the second type of operation in at least one control register;
  causing the first processing circuit to perform the first type of operation responsive to the first indication; and
  causing the second processing circuit to perform the second type of operation responsive to the second indication.

* * * * *